United States Patent [19]

Hellon

[11] Patent Number: 4,907,924
[45] Date of Patent: Mar. 13, 1990

[54] BACKWARD STARTING LOCKNUT

[75] Inventor: Keith Hellon, Libertyville, Ill.

[73] Assignee: MacLean-Fogg Company, Mundelein, Ill.

[21] Appl. No.: 280,137

[22] Filed: Dec. 5, 1988

[51] Int. Cl.⁴ ..................... F16B 39/34; F16B 39/284
[52] U.S. Cl. ................................... 411/303; 411/247; 411/324; 411/947
[58] Field of Search ........ 411/247, 248, 254, 277–279, 411/301–304, 324, 369, 371, 366, 937.1, 947; 10/86 A

[56] References Cited

U.S. PATENT DOCUMENTS

| 2,393,323 | 1/1946 | Hungerford et al. | 10/86 A |
| 3,520,342 | 7/1970 | Scheffer | 411/303 |
| 4,019,550 | 4/1977 | DeHaitre | 411/303 |

FOREIGN PATENT DOCUMENTS

| 567862 | 3/1945 | United Kingdom | 411/304 |
| 662298 | 12/1951 | United Kingdom | 411/302 |

Primary Examiner—Neill R. Wilson
Attorney, Agent, or Firm—Mason, Kolehmainen, Rathburn & Wyss

[57] ABSTRACT

A backward starting locknut comprises a polygonal-shaped metal nut having a threaded axial bore extending from a front end face normal thereto toward a recess formed in an opposite or backside of the nut body. A locking insert of resilient plastic material having a threaded bore aligned with that of the nut is seated in the recess and includes an annular, thick wall portion secured within the recess and an annular, thin wall portion integrally joined to the thick wall portion and extends outwardly from the recess and is provided with a threaded bore. The metal nut includes an annular wall section defining the recess and the wall section is deflected radially inwardly to compress the thick wall portion of the plastic insert and thereby constrict an inner portion of the threaded bore in order to establish a prevailing torque when a threaded rod is fully engaged in the bore of the insert. The outwardly extending, annular, thin wall portion of the insert permits a threaded rod to be threadedly engaged in the bore from the backside of the locknut so that the locknut can be started onto the threaded rod from the backside and threaded for a distance on the rod before prevailing torque is encountered as the rod end reaches the constricted inner, thick wall portion of the plastic insert.

17 Claims, 1 Drawing Sheet

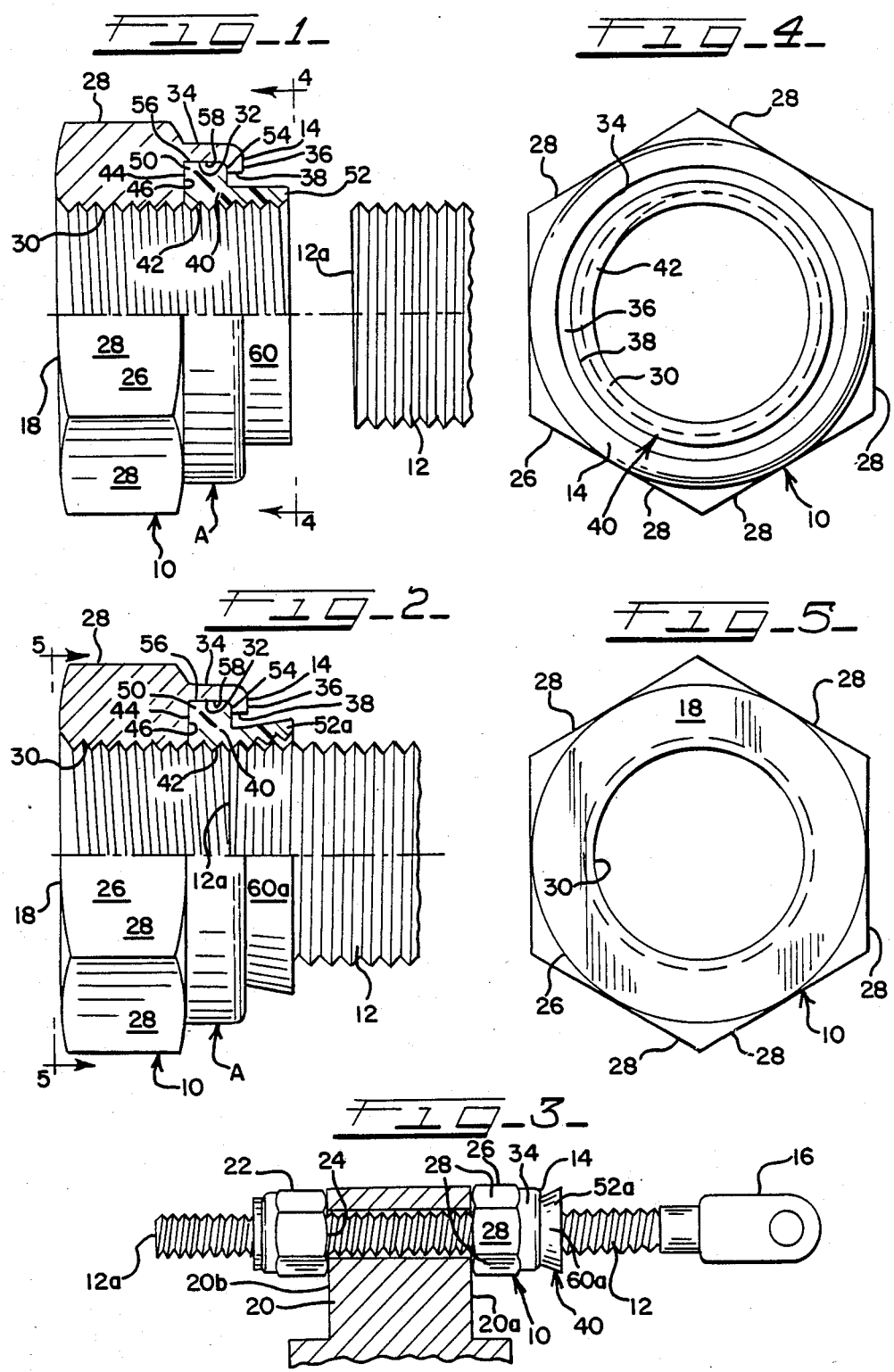

BACKWARD STARTING LOCKNUT

BACKGROUND OF THE INVENTION

1. Field of the Invention

The present invention relates to a backward starting locknut and more particularly to a backward starting locknut wherein the nut is applied onto a threaded rod or the like from the back or plastic insert side of the nut, yet still retains a desired amount of prevailing torque when the nut is fully threaded onto the rod. A prevailing torque is established between the nut and the rod because of a radially inwardly directed constriction provided on an inner, thick wall portion of a plastic locking insert mounted in a recess on a backside of the nut and the prevailing torque prevents unwanted turning movement and locks the nut in a selected place on the rod with a metal only front face of the nut ready for metal-to-metal contact with an arm or other member mounted on the rod.

2. Brief Description of the Prior Art

A wide variety of locknuts have been developed over the years and many of these locknuts are designed to resiliently seal around a threaded rod or other threaded element on which the nut is mounted so that a water-tight or liquid-tight joint is established between an end face of the nut and the threads of a threaded rod and/or an adjacent arm or other element carried on the rod and having a face generally normal to an end face of the nut.

There are also available "NYLON" insert nuts which are fully threaded to start the "NYLON" end first and these nuts depend on the "NYLON" insert constricting around the threads, only when clamped. These type of nuts are used for minimal load applications where a flexible and compressible joint face exists. Conventional "NYLON" insert nuts cannot be started "NYLON" end first because the "NYLON" insert is unthreaded. If, by extra force, the "NYLON" insert could be started, there is no way of making sure that the threads would be aligned during the transition to the already threaded metal nut. If a "NYLON" insert is threaded after assembly to the metal nut, it may be capable of starting "NYLON" end first but there would be no prevailing torque to provide a locking function.

The following U.S. patents disclose various types of locknuts:

Eckenback et al U.S. Pat. No. 2,399,107; Currlin U.S. Pat. No. 2,502,642; Wellman U.S. Pat. No. 2,653,641; DeHaitre U.S. Pat. No. 4,019,550; DeHaitre U.S. Pat. No. 4,126,170 and Witte et al U.S. Pat. No. 4,381,163.

Australian patent specification No. 123,346 also discloses a locking nut having a plastic insert which is compressed in an axial direction to provide a sealing or liquid-tight seal between elements.

OBJECTS OF THE INVENTION

It is an object of the invention to provide a new and improved backward starting locknut and more particularly a backward starting locknut which although employing a plastic, locking insert on a backside is still capable of establishing a prevailing torque after the nut is threaded onto a rod or other element from a back or insert side of the nut.

Another object of the invention is to provide a backward starting locknut, having a new and improved plastic locking insert which permits the nut to be threaded onto an elongated threaded element from a back or insert side of the nut, yet without damage to the locking insert and without substantially reducing prevailing torque or locking power of the nut when fully threaded in place.

Another object of the present invention is to provide a new and improved backward starting locknut of the character described which is simple in operation, relatively low in cost and yet foolproof in operation.

Yet another object of the present invention is to provide a new and improved locknut assembly wherein an elongated threaded rod having an enlargement at one end is operatively combined with a backward starting locknut and a separate metal arm which is mounted in a selectively adjustable position on the threaded rod with a metal-to-metal contact between a face of the locknut and a face of the metal arm free of any interference between the metal faces because of extruded or cold flow portions of the plastic nut insert.

Yet another object of the present invention is to provide a new and improved backward starting locknut which can endure a substantial and lengthy threading or rundown onto a threaded rod from an outer end thereof started from the insert or backside of the nut body, yet without damage to the threaded rod or the holding power or prevailing torque of the plastic nut insert.

BRIEF SUMMARY OF THE INVENTION

The foregoing and other objects and advantages of the present invention are accomplished in an illustrated embodiment comprising a backward starting locknut adapted to be threaded onto a threaded rod of the type having a non-removable, enlargement spaced from an outer threaded end portion on which the nut is initially started from a back or plastic insert side of the nut. A separate, metal arm is also mounted on the rod and has a metal face normal thereto. The face of the arm is adjustably positioned on the rod in relation to the enlargement depending on the position of the locknut on the rod. The backward starting locknut is especially designed to positively secure the metal arm in a selected position on the threaded rod with a metal-to-metal contact established between the abutting metal faces of the locknut and the arm without any interference or separation between the metal faces caused by extruded pieces or cold flow fragments of the plastic, locking insert of the locknut.

The backward starting locknut includes a polygonal-shaped, metal nut body having a threaded axial bore engageable with the threaded rod or other threaded element. The nut body includes a front end face, normal to the rod for engaging the metal face of the arm for permanently maintaining a selected spacing or interval between the arm and an enlargement on the threaded rod. The metal nut body includes an annular recess on the backside extended around a central threaded bore. The recess contains a locking plastic insert of cylindrical shape forming a backside of the locknut. The locking plastic insert is formed of resilient plastic material such as "NYLON" resin or fibre, strengthened or filled resin and is and secured in the recess of the nut body against both axial and rotational displacement therein. The plastic locking insert includes a threaded bore which is adapted to be engaged by the threaded rod and is formed with an annular, thick wall portion contained in the recess and an integral, annular, thin wall portion extending axially outwardly of the recess forming a backside of the nut facing toward the fixed enlargement on the threaded rod.

The annular wall section of the nut which defines the annular recess in the nut body forms an outer opening facing the backside of the nut toward the enlargement on the end of the threaded rod onto which the locknut is started. After the plastic insert is seated in the recess, the annular wall section of the metal nut body is deflected radially inwardly at the outer end to form an inturned rib or end wall for permanently securing the plastic insert in the recess. Thereafter, threads are tapped in both the nut and the insert. After the threads are formed, the annular wall section of the metal nut body is squeezed and compressed radially inwardly to exert pressure on the thick wall portion of the plastic insert contained within the recess and this constricts an inner portion of the threaded bore of the plastic insert to establish a prevailing locking torque between the locknut and a threaded rod on which the nut is mounted.

In use, the locknut is initially started and threaded onto the threaded rod from the backside of the locknut and the outwardly extending thin wall portion of the plastic insert is initially engaged on the rod. The relatively thin wall of the insert is readily deflectable outwardly so that very little prevailing torque is encountered when the nut is backed onto the threaded rod until the rod end is engaged in a bore section of the insert which is adjacent the thick wall portion thereof seated in the recess of the metal nut body. The thick wall portion of the plastic insert is contained by the annular wall section of the nut body and outward movement of the insert in a radial direction is precluded. The thick wall portion of the nut insert is thus effective to establish a predetermined value of prevailing torque between the threaded rod and the locknut regardless of the fact that the locknut was threaded onto the rod end from the backside thereof over a long distance while in continuous threaded engagement. In other types of locknuts, a long travel in threaded engagement often destroys the threads of the plastic insert so that the nut can no longer function as a locknut.

BRIEF DESCRIPTION OF THE DRAWINGS

For a better understanding of the invention, reference should be had to the following detailed description taken in conjunction with the drawings, in which:

FIG. 1 is a side elevational view (with a portion shown in section) of a backward starting locknut constructed in accordance with the features of the present invention and shown in position adjacent to a threaded end portion of an elongated, threaded rod;

FIG. 2 is an elevational view of the locknut similar to FIG. 1 but illustrating the locknut after having been started and threaded onto the rod from a backside of the nut;

FIG. 3 is an elongated cross-sectional view showing a backward starting locknut in accordance with the present invention in combination with an elongated threaded rod having an enlargement and a separate metal arm mounted on the rod and spaced a selected distance away from the enlargement and locked in the position selected by means of the locknut, in metal-to-metal, face-to-face contact between the locknut and the arm;

FIG. 4 is an end elevational view of the backside of the locknut; and

FIG. 5 is an end elevation view of a front side of the locknut.

DETAILED DESCRIPTION OF A PREFERRED EMBODIMENT OF THE INVENTION

Referring now more particularly to the drawings, therein is illustrated a new and improved backward starting locknut 10 constructed in accordance with the features of the present invention and especially designed and adapted to be threaded onto an elongated threaded element such as a threaded rod 12 from a backside or insert side 14 of the locknut. As illustrated in FIG. 3, the elongated rod 12 includes a threaded outer end portion 12a designed to initially engage the backside 14 of the locknut 10 and has an opposite end portion including a permanent enlargement 16, which precludes initial engagement with the locknut 10 from an opposite or front face 18 thereof. The annular front face 18 of the nut is perpendicular or normal to an elongated, central axis of the threaded rod 12.

The locknut 10 is especially adapted for use when it is desired to adjustably position an external separate metal element or arm 20 in precisely spaced relation with respect to the enlarged portion 16 of the threaded rod 12 and wherein it is important that a metal-to-metal, interface be established between a surface 20a on the metal arm 20 and the annular front face 18 of the locknut 10 without any interference from pieces of extruded material or cold flow segments of a plastic insert remaining or present between the abutting metal faces.

The external arm 20 includes an opposite or forward face 20b which is engaged by a metal end face of an ordinary locknut 22, which locknut is also threaded onto the outer end of portion 12a of the threaded rod 12 from the front side of the nut after the locknut 10 and the arm 20 are already in place on the rod as shown. The locknut 22 includes a forward end face 24 extending normal to the threaded rod 12 and bearing against the face 20b in metal-to-metal contact so that both opposite faces 20a and 20b of the metal arm 20 are secured in a desired position or interval spaced away from the enlarged segment 16 of the threaded rod 20 between the respective, backward starting locknut 10 and the conventional locknut 22 as shown in FIG. 3.

In accordance with the present invention, the backward starting locknut 10 includes a metal body 26 of polygonal shape having a plurality of wrench flats 28 spaced equilaterally around a central threaded bore 30 formed in the metal nut body by a conventional tapping operation in a pilot hole that is initially formed in the nut body 26. The metal nut body 26 includes an enlarged, annular, generally cylindrical recess 32 formed on the backside 14 and open to face the enlarged end portion 16 of the threaded rod 12. The cylindrical recess 32 is defined by a cylindrical, annular, metal sidewall 34 of the nut body 26 and the sidewall has a radially inwardly formed end flange or rib 36 which defines an enlarged, circular opening 38 on the backside of the nut so that an annular, resilient plastic, locking insert 40 secured in the recess 32 may extend outwardly thereof free of contact with an inner edge of the opening formed by the rib 36.

The annular plastic insert 40 includes a threaded bore 42 which is tapped from a pilot bore therein after the insert is mounted in the recess 32 and at the same time the threaded bore 30 in the metal nut body 26 is tapped in coaxial alignment therewith. The locking insert 40 includes a radial, annular, inner face 44 extending around the bore 42 and the inner face is directly and tightly engaged against a matching inside, annual bottom face 46 of the recess 32 formed in the metal nut body 26.

The plastic nut insert 40 includes an annular, thick wall portion 50 seated within the recess 32 and a thin wall portion 52 extending outwardly from the backside 14 of the metal nut body 26 through the circular opening 38 and facing toward the enlargement 16 on the threaded rod 12. The thick wall portion 50 and the thin wall portion 52 are integrally joined at an annular, shoulder 54 projecting radially outwardly of the thin wall portion toward the annular side wall 34 of the metal nut body 26. The annular radial shoulder 54 of the insert 40 is parallel of the inner end surface 44 and is engaged inwardly by an inside, radially extending annular surface of the inturned flange 36 formed at the backside of the annular metal nut body wall 34.

The thick wall segment 50 of the insert 40 includes a cylindrical, outside wall surface 56 which is directly and tightly engaged by an inside wall surface 58 of the annular wall section 34 of the metal nut body. Similarly, the thin wall portion 52 of the nut insert 40 includes a cylindrical outer wall surface 60, but this surface is spaced radially inwardly from the inner edge 38 of the inturned flange 36. The hexagonal nut body 26 and the plastic locking insert 40 are initially formed with a smooth cylindrical pilot bore that is centered with respect to a smooth cylindrical wall surface 58 defining the sidewall of recess 32.

After the annular, locking insert 40 is seated in the recess 32 and the outer end portion of the annular wall section 34 is diverted radially inwardly to form the inturned flange 36, the thick wall portion 50 of the locking insert 40 is biased in an axial direction toward the bottom face 46 of the recess 32. This pressing engagement prevents the locking insert 40 from rotating relative to the metal nut body 26 and at the same time increases the contact pressure of engagement between the outer cylindrical surface 56 of the thick wall portion 50 and the inner surface 58 of the metal wall section 34 of the nut body 26. After the inturned flange 36 has thus been formed, the assembled unit is threaded or tapped with a tapping member extended through the pilot bores of the nut body 26 and locking insert 40 in succession to form a continuously threaded bore 30 in the nut body 26 and the threaded bore 42 in the plastic locking insert 40.

After tapping of the threaded bores 30 and 42 has been completed, the outside cylindrical surface of the annular wall section 34 of the metal nut body 26 is subject to a radial inwardly directed compression as indicated by the arrows A in FIGS. 1 and 2 and this compressive force causes the threaded bore segment 42 of the locking insert 40 within the recess 32 to be constricted radially inwardly to provide a degree of thread interference so that a prevailing torque will be established when the locknut 10 is threaded onto the outer end 12a of a threaded rod 12. The constriction of the threaded bore 42 in the locking insert 40 occurs mainly in the thick wall portion 50 thereof constrained by the metal wall section 34 but the thin wall portion 52 of the insert 40 is somewhat free to deflect radially outwardly into an expanding frustoconical shape 52a as indicated in FIGS. 2 and 3 when the threaded rod 12 is well engaged within the threaded bore 42 of the locking insert 40.

Initial engagement of the endmost threads on the threaded rod 12 with the outermost threads in the bore 42 of the thin wall portion 52 of the insert 40 results in the thin wall portion being deflected outwardly into a frustoconical shape as indicated by the reference numeral 52a in FIG. 2. Because there is no interference or contact between the inner edge of the inturned flange 36 defining the opening 38 and an outer surface 60 of the thin wall portion 52, outward radial deflection is only resisted by the strength of material in the thin wall portion. This deflection allows for easy starting and threading of the locknut 10 from the backside 14 onto the rod 12 until such time as the rod end 12a enters the constricted bore 42 of the thick wall portion 50 of the plastic insert 40.

When the end 12a of threaded rod 12 engages these constricted thread portions of the bore 42, a prevailing torque is established between the plastic insert 40 and the threaded rod 12, and the amount of prevailing torque established is determined by the amount of inward compression of the metal wall section 34 of the nut body 26. Without such compression, little or no prevailing torque would be provided after tapping of the threads in the bore 42 of the insert 40 is completed.

The unique shape of the nut insert 40 including the inner, thick wall portion 50 having a constricted bore 42 and the outer, deflectable thin wall portion 52 produces a new and unique result that permits backward starting of the locknut 10 on the threaded rod 12 so as to provide metal-to-metal contact between the front face 18 of the nut body 26 and the metal surface 20a of the arm 20. The metal-to-metal contact is free of any interference caused by extruded pieces or cold flow portions of the plastic insert 40 lodged between the surfaces 18 and 20a.

The locking insert 40 is formed of resinous plastic material such as "NYLON" resin and other resins having good resistance against cold flow are also used. These resins may also be reinforced with glass fibres, "KEVLAR" fibres, aramid fibres, mineral fibres, etc., to provide higher strength and different frictional properties as may be needed for particular applications.

While the invention has been described with reference to details of the illustrated embodiments, it should be understood that such details are not intended to limit the scope of the present invention as defined in the appended claims.

What is claimed and desired to be secured by Letters Patent of the United States is:

1. A backward starting locknut, comprising:
   a polygonal-shaped, metal nut having a threaded axial bore extending from an end face normal thereto toward a recess formed on an opposite end; and
   a locking insert of resilient plastic material having a threaded bore aligned with that of said nut and having an annular, thick wall portion mounted in said recess and an annular, thin wall portion projecting outwardly of said recess around said threaded bore;
   said nut having an annular wall section defining said recess and deflected inwardly to compress said thick wall portion of said insert radially inwardly to constrict an inner portion of said threaded bore of said insert for establishing a prevailing torque when a threaded element is engaged therein.

2. The backward starting locknut of claim 1, wherein:
   said nut includes an end wall at said opposite end comprising a radially inwardly projecting rib bearing against said thick wall portion of said insert in an axial direction parallel of said bore for securing said insert against axial movement relative to said metal nut.

3. The backward starting locknut of claim 2, wherein:
said ring defines an axially aligned opening of said recess opposite said normal end face, and
said thin wall portion of said insert extends outwardly through said opening beyond said rib in an axial direction away from said normal end face.

4. The backward starting locknut of claim 2, wherein:
said insert includes an intermediate annular radial shoulder dividing said insert between said thin wall portion and said thick wall portion; and wherein said rib is seated against said radial shoulder.

5. The backward starting locknut of claim 4, wherein:
said recess includes an annular radial face spaced inwardly of said rib and engaged by an inner end face of said insert.

6. The backward starting locknut of claim 5, wherein:
said thick wall portion of said insert is compressed in an axial direction between said rib and said radial face of said recess.

7. The backward starting locknut of claim 2, wherein:
said recess includes an axially extending inside wall surface of said annular wall section of said nut extending around said insert between said rib and a radial surface of said insert normal to said bore, and
wherein said inside wall surface is compressed radially inwardly against said thick wall portion of said insert for constricting said threaded bore therein to provide said prevailing torque.

8. The backward starting locknut of claim 7, wherein:
said rib comprises an outer end portion of said annular wall section of said nut turned radially inwardly toward said insert when said bore is constricted.

9. The backward starting locknut of claim 8, wherein:
said rib is spaced radially outwardly away from said thin wall portion of said insert for permitting outward deflection of said thin wall portion when a threaded element is engaged in said threaded bore thereof from an outer end.

10. The backward starting locknut of claim 4, wherein:
said thin wall portion of said insert has an axial dimension outwardly of said shoulder that is greater than an axial dimension of said thick wall portion inwardly of said shoulder.

11. In combination with a threaded rod having a non-removable enlargement spaced from an outer threaded end portion and a metal element mounted on said rod having a face normal thereto to be adjustably positioned in relation to said enlargement; a backward threaded locknut, comprising:
a polygonal-shaped metal nut having a threaded axial bore engaged with said threaded rod and an outer end face normal to said rod engaging said face of said metal element for maintaining a selected interval between said metal element and said enlargement on said rod, said nut having an annular recess around said rod facing said enlargement for containing a locking insert;
a locking insert of resilient plastic material mounted in said recess and secured to said metal nut against axial and rotational displacement, said insert having a threaded bore engaged by said rod and including a thick wall portion in said recess and a thin wall portion extending axially outward of said recess toward said enlargement;
said nut having an annular wall section defining said recess with an outer opening facing said enlargement and deflected radially inwardly to exert pressure on said thick wall portion of said insert to constrict an inner portion of said threaded bore for providing a prevailing locking torque between said locknut and said rod to maintain said selected interval.

12. The combination of claim 11, wherein:
said thin wall portion of said insert is deflectable radially outwardly when said locknut is threaded onto said outer end of said threaded rod toward said enlargement thereby resulting in minimum torque required until said thick walled portion is engaged on said threaded rod.

13. The combination of claim 11, wherein:
said outer end face of said nut is spaced apart from said recess in a direction axially of said threaded bore.

14. The combination of claim 13, wherein:
said recess includes an inner annular bottom wall around said threaded bore in spaced apart parallel relation to said outer end face of said nut.

15. The combination of claim 14, wherein:
said recess includes a cylindrical side wall surface in coaxial alignment with said threaded bore in engagement with said thick wall portion of said insert.

16. The combination of claim 15, wherein:
said insert includes an annular radial shoulder intermediate opposite ends between said thin wall portion and said thick wall portion; and
said annular wall section of said nut includes an inturned annular flange at an outer end having a radial, annular, inside flange surface engaging said radial shoulder of said insert for securing said insert in said recess.

17. The combination of claim 16, wherein:
said radially inturned flange of said annular wall section defines said opening of said nut facing said enlargement, and
said thin wall portion of said nut extends outwardly through said opening toward said enlargement.

* * * * *